Patented June 7, 1927.

1,631,589

UNITED STATES PATENT OFFICE.

WILLIAM M. GROSVENOR AND VICTOR P. GERSHON, OF NEW YORK, N. Y.; SAID GERSHON ASSIGNOR TO SAID GROSVENOR.

ANTHRAQUINONE PASTE AND METHOD OF MAKING THE SAME.

No Drawing.   Application filed October 10, 1921. Serial No. 506,788.

The invention relates to improvements in anthraquinone paste and method of making the same. The main object of the invention is to produce a more highly effective aqueous paste than has heretofore been produced for dyeing or printing work. Further and more specific objects, features and advantages will more clearly appear from the detailed description given below.

Anthraquinone is most commonly used in the manufacture of dyes such as alizarin and as a catalytic or protective material in textile printing or the like, assisting in the discharge or stripping of vat colors, the edging of stripes or the like.

For the first purpose anthraquinone has been sublimed to purify the same and the anthraquinone condensed in the form of needles of varying length of a yellow or orange color. In such case hot air or steam have been used to help carry the anthraquinone vapors to the condenser and sometimes a water spray has been used to aid in cooling the product and reduce the fire risk. The resultant product was a wet product, which as we have discovered, contained a large proportion of large needles or flakes due to the poor mixture of steam and anthraquinone vapors and the irregular cooling produced by the water spray. The product was then thoroughly dried for use in making dyestuffs.

For the purpose of making a catalytic or protective material for use in textile printing a more finely divided and more nearly colloidal product was desired and since its action for this purpose was not so largely dependent on chemical purity but rather on a fine physical state of subdivision it has been prepared by precipitating the anthraquinone from its solution in sulphuric acid by dilution of the latter. In this manner a paste is prepared which may contain 70% to 80% moisture but which on standing separates into two layers, water above and concentrated paste below and which layers are then difficult to thoroughly remix. This paste was also contaminated with more or less black tarry matter from the sulphuric acid solution. This coated the particles of anthraquinone and as we have discovered rendered them less effective as a catalytic or protective material in textile printing and the like. Washing with caustic soda or resolution in fresh sulphuric failed to remove this and produced only a gray brown or dull muddy looking material only partly activized. Furthermore this method while expensive did not produce an evenly dispersed material because the particles formed at the beginning of the dilution were formed under different dispersive and nucleated conditions from those formed at the middle or those at the end of the dilution, and in order to produce a filterable material many large particles were necessarily produced and much of the anthraquinone obviously wasted both in the oversize particles on the one hand and by losses through the filter on the other.

We have discovered that by a suitable adjustment of the condition of dispersion of the anthraquinone before precipitation, whether from water, air or steam or other fluid followed by a sudden and uniform precipitation of the anthraquinone throughout the mass of dispersion medium being treated, it is possible to produce an anthraquinone preparation which we call sublimed paste, which possesses the valuable properties of both the sublimed and the paste products (which properties have hitherto been regarded as contradictory) and which can be easily, rapidly and economically produced by a special method of sublimation. This product is characterized by its entirely different color (when not purposely contaminated) from pastes hitherto made, by its fine and substantially even state of ultimate division, by the great permanence with which it remains in substantially equal and even distribution with water in 20% paste without substantial separation, by its increased activity and effectiveness such that a paste of 20% has all the catalytic or covering power of a 30% paste as heretofore produced. Thus a great economy in use as well as in production is accomplished.

As an example of one form of making this new paste, we first take ordinary crude anthraquinone either in crystal or powdered form and sublime it with steam (preferably superheated steam) in the usual way, except however, that care is taken to introduce a large amount of steam, as for example three times as much steam as anthraquinone by weight, and to insure that the admixture of the steam and the anthraquinone vapors shall be quite thorough and complete. However, this amount of steam may be varied according to the thoroughness of mixture and the quality of paste to be desired. This mixture may be accomplished either by passing the steam up through the anthraquinone or supporting the latter in baskets or on shelves so that the steam shall pass back and forth around it or by fan agitation of the mixture or by any other suitable means. This relatively thorough inter-mixing of steam and anthraquinone vapor is one of the important features to the successful production of the sublimed paste when this method of dispersion is used. The next step in the preferred method is to suddenly and completely chill the diluted anthraquinone vapors and we prefer to do this by atomizing large quantities of cold water into the mixed vapors at numerous points and from numerous directions so arranged as to violently and thoroughly mix and agitate the vapors in contact with the cold water. It is best not to rely to any substantial degree on the walls of the chamber to produce this cooling. Experience has shown that to get the best results the quantity of cold water thus used should several times (say four or more times by weight) exceed the total weight of the paste to be produced.

The result of the above is a precipitated rain of sloppy paste that is preferably not allowed to collect on the walls or sides of any vessel or chamber or drain until it has been mixed and equalized throughout. It is pale yellow in color, and, when examined under the microscope is practically free from compact masses or lumps of closely clotted needles of various sizes, many of them running up to .010 mm. in diameter as in the paste hitherto produced. On the contrary it consists largely of practically transparent needles evenly disseminated or loosely aggregated practically none of which exceed .005 mm. in diameter and .05 mm. in length and exhibiting a clean surface and absence of discoloration that is believed to indicate freedom from surface contamination and a fully activized condition of these surfaces. When properly made this sublimed paste, when drained to contain about 20% of anthraquinone, no matter how long it is allowed to stand in storage vessels, does not exhibit any substantial separation of water and anthraquinone. Actual commercial tests of its effectiveness when properly made have shown it to be from 50% to 100% more effective than the precipitated paste hitherto made for textile printing. We believe this to be due in part to the purity and cleanliness of surfaces and in part to the fineness and regularity of dispersion, both of which qualities we obtain in the same product in a simple and efficient manner.

In carrying out the above process one can use the ordinary sublimers provided with superheated steam and water sprays and so adjust the rate of sublimation and steam supply and size of water sprays as to be able in a substantial measure to secure the advantages of the present invention but hitherto anthraquinone made by sublimation has not been regarded as fine enough or even and smooth enough in texture or catalytically active enough to be useful for the printing purposes for which paste is required. Wet sublimation has been used, so far as we are aware, only as a step in the preparation of dry anthraquinone for manufacture of dyes and in such case the product was entirely different as it did not have the fineness and evenness of dispersion and freedom from closely clotted masses of crystals, many of them excessive in size. We believe this product was never used for paste because the yellow material was supposed to be inactive and because the conditions required to produce the qualities needed in industrial paste were unknown.

As distinguished from the product of the present invention the acid precipitated paste heretofore used, when examined under the microscope, is seen to contain many rounded particles, many crystals of pointed or lenticular shape and many closely clotted compact masses of crystals. The diameters of these crystals and crystal masses vary all the way from .005 mm. to .03 mm. in diameter and even larger, so that the effective surface per unit of weight is enormously reduced. Furthermore these needles and aggregates are seen to be wholly or partly covered or bound together with more opaque material frequently collected in nodular or rounded excrescences attached to the crystals or loosely disseminated through the liquid between the crystals. Finally the general appearance of the paste is gray or brown and not a clear clean yellow indicating active anthraquinone surface.

It is obvious that the method of preparing the product may be modified in various ways, as by subliming without air or steam and then mixing with air, or with water vapor and chilling suddenly by any suitable means (as by rapidly scraped or brushed and continually cooled metallic surfaces, or by sudden expansion, or sudden admixture of large volumes of cold gas). Also the new product may be prepared by other means as by solution of pure or of sublimed anthraquinone in substantially pure acid or other solvent and sudden precipitation by atomization with steam. Therefore, we do not wish to limit ourselves to the preferred method of making it described in the specific example. Similarly the resulting product may be varied without departing from the spirit and scope of the invention in its broader aspects.

What we claim is:

1. The improved anthraquinone paste, comprising a mixture of sublimed anthraquinone and water, and capable of holding about 80% of water without substantial separation thereof on standing.

2. The improved anthraquinone paste and comprising a mixture of water and relatively short anthraquinone needles, the paste being substantially free of needles over about five thousandths millimeter in diameter and the needles being separated and loosely aggregated instead of clotted in character.

3. The improved anthraquinone paste having a clear yellow color and consisting substantially of short needles of a diameter about five thousandths millimeter or less, separated and loosely aggregated and substantially free from compact crystal masses and the crystals being substantially free from rounded or nodulated excrescences.

4. The improved anthraquinone paste comprising a mixture of anthraquinone and water in which the anthraquinone is dispersed to such a degree as to make an aqueous paste of substantially stable homogeneity containing about 20% or less of anthraquinone and substantially free from compact crystal masses, the crystals being substantially free from rounded or nodulated excrescences.

5. The process of making anthraquinone paste which consists in thoroughly admixing sublimed anthraquinone vapor with steam and suddenly chilling the mixture by violent agitation with water sprays injected at various directions relative to the movement of the vapors.

6. The process of making anthraquinone paste which consists in thoroughly admixing sublimed anthraquinone vapor with steam and suddenly chilling the mixture by violent agitation with water sprays injected at various directions relative to the movement of the vapors and supplying about three or more times as much water as there is anthraquinone by weight.

7. The process of making anthraquinone paste which consists in thoroughly mixing sublimed anthraquinone vapor and at least about three times its weight of steam and suddenly chilling the mixture.

8. The process of making anthraquinone paste which consists in thoroughly mixing sublimed anthraquinone vapor and at least about three times its weight of steam and suddenly chilling the mixture by spraying water into the same.

9. The process of making anthraquinone paste which consists in thoroughly mixing sublimed anthraquinone vapor and at least about three times its weight of steam and suddenly chilling the mixture by spraying water into the same, the amount of water sprayed into the anthraquinone being at least about twenty times the weight of the anthraquinone.

Signed at New York, in the county of New York, and State of New York this 7th day of October, A. D. 1921.

WILLIAM M. GROSVENOR.
VICTOR P. GERSHON.